United States Patent [19]

Strongin

[11] Patent Number: 5,095,213
[45] Date of Patent: Mar. 10, 1992

[54] METHOD OF USING AN OPAQUE PLASTIC MICROSCOPE SLIDE FOR EPI-FLUORESCENT MICROSCOPY

[75] Inventor: Perry Strongin, Cupertino, Calif.

[73] Assignee: Syntex (U.S.A.) Inc., Palo Alto, Calif.

[21] Appl. No.: 266,731

[22] Filed: Nov. 3, 1988

[51] Int. Cl.[5] .......................... G02B 21/34; G02J 1/58
[52] U.S. Cl. .............................. 250/459.1; 250/458.1; 250/365; 356/317; 356/244; 359/398; 359/396; 524/495; 524/584
[58] Field of Search ................ 350/534, 536; 250/365, 250/458.1, 459.1; 382/6; 524/495, 496, 584; 356/317, 318, 417, 244

[56] References Cited

U.S. PATENT DOCUMENTS

| | | | |
|---|---|---|---|
| 3,939,350 | 2/1976 | Kronick et al. | 250/365 |
| 4,094,745 | 6/1978 | Scholefield . | |
| 4,120,991 | 10/1978 | Ornstein et al. . | |
| 4,207,554 | 6/1980 | Resnick et al. | 382/6 |
| 4,216,137 | 8/1980 | Wang et al. | 524/495 |
| 4,391,941 | 7/1983 | Cotton et al. . | |
| 4,427,889 | 1/1984 | Muller . | |
| 4,587,213 | 5/1986 | Malecki . | |
| 4,734,450 | 3/1988 | Kawai et al. | 524/413 |

OTHER PUBLICATIONS

Hartmann et al., Microscopica Acta, 81, No. 5 pp. 407-409 (1979).

*Primary Examiner*—Jon W. Henry
*Attorney, Agent, or Firm*—Theodore J. Leitereg; Gerald F. Swiss

[57] ABSTRACT

Disclosed is a novel microscope slide. The slide of this invention is a plastic microscope slide which is optically opaque and substantially non-fluorescent. The slide of this invention has particular utility in epi-fluorescent microscopy.

7 Claims, 1 Drawing Sheet

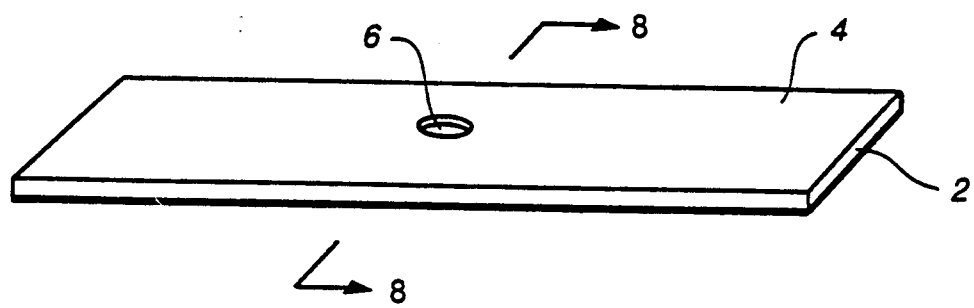
FIG._1
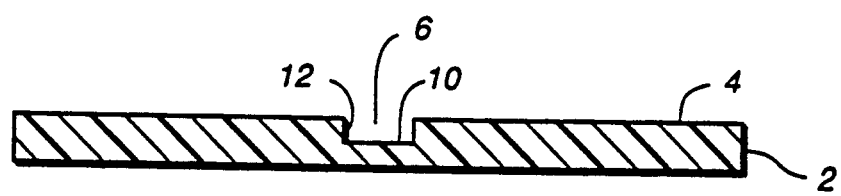
FIG._2

METHOD OF USING AN OPAQUE PLASTIC MICROSCOPE SLIDE FOR EPI-FLUORESCENT MICROSCOPY

BACKGROUND OF THE INVENTION

1. Field of the Invention

This invention relates to a novel plastic slide having particular utility in epi-fluorescent microscopy. In particular, the plastic slide of the instant invention is composed of an optically opaque and substantially non-fluorescent composition.

2. Related Art

Epi-fluorescent microscopy, also referred to as incident fluorescent microscopy, is a well-known technique where a sample which is either fluorescent or is labeled with a fluorescent marker, is examined under radiation which induces fluorescence, typically ultraviolet radiation. The radiation excites the sample resulting in the sample fluorescing, thereby giving an indication of its presence, and to a certain extent its quantity. Epi-fluorescent microscopy has particular utility in the area of fluorimmunoassay and immunofluorometric assay.

Several problems exist with regard to epi-fluorescent microscopy. Initially, as discussed by James, "Light Microscopic Techniques in Biology and Medicine", pages 152-164 (1976) and by Locquin et al, "Handbook of Microscopy", pages 49-51 (1983), great care must be taken to ensure against background fluorescence, i.e., fluorescence arising not from the sample being tested but from exogenous sources such as the mounting medium, the immersion oil, the microscope objective, etc. The effect of background fluorescence will be either poor sample testing results or in the extreme, inaccurate results. Secondly, the yield in flux of fluorescent radiation arising from the tested sample is only of the order of 0.1% or even less of that emitted by the excitation radiation source (which is subsequently filtered out). However, because of the low flux of fluorescent radiation, it is sometimes difficult to detect this fluorescence. This problem is compounded by the fact that the radiation generated by the fluorescence is generated in all directions. Accordingly, unless blocked, a portion of the generated radiation will be directed upward in the general direction of the eyepiece (or other detection means) and a portion will be generally directed downward away from the eyepiece (or detection means). Obviously, the fluorescent radiation directed away from the eyepiece (or detection means) will escape detection thereby limiting even further the amount of fluorescent radiation subject to detection.

Glass microscope slides routinely employed in epi-fluorescent microscopy are advantageous insofar as such slides are not generally autofluorescent and therefore will not contribute to background fluorescence. However, on the negative side, glass slides do transmit visible radiation which is generally the fluorescent radiation of importance in epi-fluorescent microscopy. As such, that portion of the fluorescent radiation which is transmitted away from the detection means will not be subject to detection. Moreover, as is well apparent, glass slides are subject to breakage prior to and during sample observation. Breakage occurs most often during sample shipment and/or transportation but may also occur during slide preparation or sample observation. Breakage is a serious safety hazard because certain biohazards, i.e., viruses, bacteria, etc., contained in the test sample on the slide, may upon slide breakage expose the person handling the broken pieces of slide(s) to the biohazard. This problem is compounded by the fact that broken glass is frequently in a form which facilitates puncture and/or cuts to the handler and thereby increasing the handler's exposure risks. Accordingly, this breakage problem requires an increased level of care in slide preparation, shipment and sample observation. Therefore, it would be desirable to find a substitute for glass slides in epi-fluorescent microscopy. Such a substitute should preferably be non-fluorescent so as not to contribute to background fluorescence and should be optically opaque so as to prevent transmission of visible fluorescent radiation away from the detection means. Even more preferably, the optically opaque and substantially non-fluorescent slide should be resistant to the solvent employed in the test sample so as to prevent undo degradation of the slide and should be made of not easily breakable material. What I have found and what the instant invention is directed toward is a plastic slide which is optically opaque and substantially non-fluorescent. In a preferred embodiment, the plastic slide of this invention is additionally non-breakable and solvent-resistant.

Plastic slides are known in the art. For example, Malecki, U.S. Patent No. 4,587,213 discloses transparent plastic microscope slides prepared from materials such as celluloid, cellophane or urea formaldehyde resins or other synthetic resins such as cellulose acetate ethylcellulose, etc. Likewise, Muller, U.S. Pat. No. 4,427,889 discloses a microscope slide prepared from a copolymer of polyethylene and polypropylene. However, untreated plastic slides made from synthetic resins are autofluorescent and therefore not suitable for epi-fluorescent microscopy. Moreover, nothing in these references teaches the addition of any component which will render the plastic slide substantially non-fluorescent. Ornstein et al, U.S. Pat. No. 4,120,991, discloses the glass microscopic slides containing mounting mediums of hard synthetic resins. Scholefield, U.S. Pat. No. 4,094,745, discloses a fluorescent microscopy procedure which employs a carrier plate which can be a microscope slide, a plastic film or an opaque plate or strip. However, nothing in Scholefield teaches or suggests the type of opaque plate employed i.e., opaque glass or plastic, how the opaque plate is prepared, whether the opaque plate is substantially non-fluorescent, etc. Hartmann et al, Microsc.. Acta., Volume 81, No. 5, pages 407-409 (1979) discloses a slide for incident fluorescent microscopy, i.e., epifluorescent microscopy, which consists of placing a thin layer of black silicon rubber paste on a microscopic slide, placing the sample onto this silicon rubber paste and then placing a cover glass over the silicon rubber. The black silicon rubber is employed by Hartmann et al as an embedding or adhesion material. Accordingly, the slide of Hartmann et al is a "sandwich slide" wherein the sample on the silicon rubber is placed between the microscope slide on the bottom and a glass cover on the top.

Lastly, Cotten et al discloses stabilized polypropylene compositions wherein the polypropylene is stabilized against degradation by ultraviolet and visible light by the addition of heated treated carbon black. However, nothing in Cotten et al teaches or suggests that the addition of a sufficient amount of carbon black will render polypropylene non-fluorescent.

SUMMARY OF THE INVENTION

The instant invention is directed toward a plastic microscope slide which is optically opaque and substantially non-fluorescent. In a preferred embodiment, the instant invention is directed toward a plastic slide comprising a body with first and second sides, wherein the body is composed of a plastic containing a sufficient amount of carbon black to render the body optically opaque and substantially non-fluorescent.

The slide of this invention has particular utility in epi-fluorescent microscopy where it represents an improvement over the prior are glass and/or plastic slides. Therefore, in its method aspect, the instant invention is directed toward a method of conducting epi-fluorescent microscopy for testing for the presence of the absence of a compound in a test sample contained on a slide by directing exciting radiation onto the test sample under conditions suitable to stimulate fluorescence and monitoring the test sample for fluorescence. The improvement of the present invention comprises employing a plastic microscope slide which is optically opaque and substantially non-fluorescent.

In a preferred embodiment, the method aspect of this invention is directed toward a method of conducting epi-fluorescent microscopy for testing for the presence or the absence of a compound in a test sample contained on a slide by directing exciting radiation onto the test sample under conditions suitable to stimulate fluorescence and monitoring the test sample for fluorescence. The improvement comprises employing a microscope slide comprising a body with first and second sides. The body is composed of a plastic containing a sufficient amount of carbon black to render the body optically opaque and substantially non-fluorescent.

The optically opaque and substantially non-fluorescent slide of this invention is preferably employed in conducting fluorimmunoassays and immunofluorometric assays by epi-fluorescent microscopy.

In a preferred embodiment, the plastic is derived from a polyolefin derived from $C_2$-$C_5$ olefins and copolymers and terpolymers thereof. More preferably, the plastic is derived from a polyolefin of from 2 to 3 carbon atoms and copolymers thereof. Nost preferably, the plastic is derived from polypropylene.

Also, in a preferred embodiment, the plastic slide is solvent-resistantt and non-breakable. More preferably, the plastic slide is non-fluorescent.

In a preferred embodiment, the slide of this invention has one or more cavities, i.e., sample wells, which are designed to hold he sample being tested ("test sample"). The cavities are contained on the first side. Preferably, the base of the cavities is uniformly flat thereby permitting microscopic observation of the test sample with minimal need to refocus. The depth of the cavities is governed by the working distance of the microscope objective which is subject to variation. Accordingly, the depth is generally a distance within the focus range of the objective. However, in a preferred embodiment, the depth of the cavity is maximally five ten-thousandth's of an inch (0.0005 inch).

The two dimensional shape of the cavities on the surface of the first side of the slide is not critical and can be conveniently circular, opal, square, etc. The shape is determined by the mold employed to prepare the slide.

As used herein, the following terms have the following meanings:

"Optically opaque"—means that no visible light will be transmitted through the plastic composition, i.e., the plastic containing carbon black.

"Substantially non-fluorescent"—means that the plastic composition is either non-fluorescent or if it is fluorescent, the amount of fluorescence resulting from the plastic composition does not interface with the epi-fluorescent microscopy test.

"Solvent resistant"—means that those solvents which are generally employed with the test sample, i.e., water, methanol, acetone, etc., will not cause such degradation or deterioration of the plastic slide during routine slide use so as to render the slide unsuitable for use in epi-fluorescent microscopy. "Epi-fluorescent microscopy"—means fluorescent microscopy wherein the excitation radiation originates from the same side of the test sample as the detection means.

"Non-breakable"—means the plastic employed in the slide is not subject to breakage during routine use including packaging and shipping of the slides and slide preparation, use and observation.

BRIEF DESCRIPTION OF THE DRAWINGS

FIG. 1 is an overview of a microscope slide of the instant invention.

FIG. 2 is an enlarged sectional view of the slide shown in FIG. 1 taken along lines 8—8 of FIG. 1.

DETAILED DESCRIPTION OF THE INVENTION

Referring now to the drawings, a preferred microscope slide of the present invention is illustrated in FIG. 1. In particular, FIG. 1 shows an overview of microscope slide 2 having a first side 4 and a second side (not shown). Preferable, the second side is substantially parallel to the first side 4 and represents the bottom of the slide. The first side 4 contains a cavity 6 which is employed to hold test sample (not shown). Additional cavities on the first side 4 of slide 2 are contemplated by this invention. Also contemplated by this invention are microscope slides having no cavities. FIG. 2 is an enlarged sectional view of the slide shown in FIG. 1 taken along lines 8—8 of FIG. 1. In FIG. 2, slide 2 having cavity 6 is shown cut through cavity 6. The base 10 of cavity 6 is below the first side 4 at a suitable depth, 12 which is the distance of the cavity wall. As noted above, the depth 12 of the cavity 6 is governed by the working distance of the microscope objective which is subject to variation. Accordingly, the depth 12 is generally a distance within the focus range of the objective. Preferably, depth 12 is maximally five ten-thousandth's of an inch (0.0005inch). Base 10 of cavity 6 represents the bottom of cavity 6. Preferably, base 10 is uniformly flat thereby permitting microscopic observation of the test sample with minimal need to refocus. However, other configurations, i.e., irregular, semi-spherical, etc., for base 10 are contemplated by this invention insofar as such other configurations merely require additional refocusing.

Slide 2 is prepared from a plastic containing a sufficient amount of carbon black to render the plastic optically opaque and substantially non-fluorescent. By themselves, the plastics employed in this invention are not optically opaque. Additionally, these plastics suffer an additional drawback insofar as they possess autofluorescence. The addition of carbon black to the plastic allows one to achieve a slide which is both optically opaque and substantially non-fluoresecent. The addition of carbon black transforms the plastic to an optically opaque composition. Accordingly, a feature of this invention is that a sufficient amount of carbon black be added to the plastic to render it optically opaque and substantially non-fluorescent. In general, this can be accomplished by adding from about 0.5 to 5% by weight of carbon black to the plastic. Preferably, about 1 to 5% by weight of carbon black is added to the plastic and more preferably, about 1%-2% by weight of carbon black is added to the plastic.

The plastic employed in this invention is not critical and any plastic which results in an optically opaque and substantially non-fluorescent resin upon the addition of a sufficient amount of carbon black can be used. Preferably, the plastic composition should be non-breakable and solvent-resistant.

Suitable plastics for use in this invention include polyolefins, polyamides, polyacarylamides, polyesters, polyacrylic esters, polycarbonates, polytetrafluoroethylene, polyvinyl acetates, etc. Included within the term "plastics" are plastic compositons containing fillers (such as glass fillers), extenders, stabilizers, antioxidants, etc. Plastics with desired properties for use as microscope slides are either commercially available or can be prepared by art recognized techniques.

Preferred plastics for use in this invention are the polyolefins and more preferably the polyolefins are derived from $C_2$-$C_5$ olefins including the copolymers and terpolymers thereof. Particularly preferred polyolefins are polyethylene and polypropylene and copolymers thereof. Most preferably, the polyolefin is polypropylene.

The plastic slides of this invention are prepared in the case of polyolefins and other thermoplastics by heating the plastic to form a melt. To this melt is added the requisite amount of carbon black under conditions which ensure that the carbon black is uniformly dispersed throughout the melt. The melt composition is then subjected to injection molding into a slide mold which upon cooling forms the slides of this invention. On the other hand, the carbon black may be added during or after the polymerization reaction. Addition of additives during or after the polymerization reaction is well known in the plastics art. Preparation of plastic products by melting and injection molding is disclosed by Kirk-Othmer, "Encyclopedia of Chemical Technology," 3rd Edition, Volume 18, pages 184-206 (1979).

The flatness of base 10 of the plastic microscope slide is determined by the shape of the mold and the pressure employed in the injection molding. Preferably, the mold shold have a base 10 which is of acceptable flatness; while the pressure employed in the injection process should be sufficiently high to ensure that the flatness of base 10 of the mold is transferred to the slide prepared from the mold. In general, initial injection pressures of greater than 500 psi and preferably about 750 psi are employed. After injection, a holding pressure of about 300-400 psi, preferably about 350 psi is employed to hold the melt in the mold until the melt hardens into the plastic slide. In a preferred embodiment, the edges of the slide are beveled to facilitate slide removal from the mold. Additionally, the mold will contain ejector pins which also facilitates uniform removal of the slide from the mold.

As noted above, the plastic slides of this invention can be used to conduct immunofluorometric assay and fluorimmunoassy. In such assays, it is common to have two or more cavities on the surface of the plastic slide wherein one or more wells contain test sample(s), the results of which are compared against a standard which is also contained in a cavity. In this situation, it is not uncommon for the standard to employ a solvent which is different from that employed by the test sample, i.e., the test sample can be dissolved in methanol and the standard in water. In this case, the wettability of the cavity surface becomes important insofar as the solvent employed with the test sample can interact differently with the cavity surface than the solvent employed with the standard thereby making the comparisons more difficult. In such situations, improving the wettability of the cavity surface can substantially minimize this problem. One method for improving the wettability of the uniformily flat surface of the cavity is by making this surface more rough. This can be accomplished by bead blasting the portion of the mold which forms the cavity-(ies) on the slide surface prior to slide manufacture. Other means of improving wettability include plasma treatment of cavity surface. Lastly, in some cases the test samples will contain components such as mucus, proteineceous material, etc. which will provide the necessary surface wettability.

In a preferred embodiment, the slide of this invention has art work on surface 4 but not in the cavity 6. This art work can be placed in such a manner so as to define cavity 6 which facilitates sample observation, i.e., the observer can readily distinguish between the cavity and the remainder of the slide. Such art work could include printed, silk screen, hot stamped or decal art work; each of which are art recognized techniques. In one embodiment, the plastic slide will be uniformly flat and the art work will be raised above the slide and will contain area(s) having no art work thereby defining the cavity-(ies). In another embodiment, the art work can be placed in the cavities.

The following example is offered to specifically illustrate this invention. This example and illustration are not to be construed in any way as limiting the scope of this invention.

EXAMPLE 1

To pellets of Pro-Fax ® Polypropylene 6331 (available from Himont U.S.A. Inc., Wilmington, Del. (19894) was added sufficient pellets of Spectra Color #KSC-5000 (50% low density polyethylene and 50% carbon black—available from Spectra Chemical & Color, Inc., Mission Viejo, Calif. 92691) to provide 1% by weight of carbon black to the mixture. Afterwards, the mixture is dispersed by dry tumbling for twenty minutes. Then the mixture was heated to form a melt. After melting, the melt was allowed to flow through a back pressure of 150 pounds per square such (psi) to induce high shear effects on the mixture so as to ensure thorough mixing. The material was then injected into a steel injection mold that makes a slide configuration, at an initial pressure of 750 psi. After injection, the pressure was cut back to a holding pressure of 350 psi and after hardening of the plastic, a plastic slide of this invention was uniformly removed from the mold by use of ejector pins.

What is claimed is:

1. A method of conducting epi-fluorescent microscopy for testing for the presence or absence of a compound in a test sample contained on a slide by directing exciting radiation onto said sample under conditions suitable to stimulate fluorescence and monitoring the test sample for said fluorescence wherein the improvement comprises employing a plastic microscope slide comprising a body with first and second sides, said body being composed of a plastic containing a sufficient amount of carbon black to render said body optically opaque and substantially non-fluorescent.

2. A method according to claim 1 wherein the plastic microscope slide is solvent-resistant.

3. A method according to claim 1 wherein the plastic microscope slide contains one or more cavities.

4. A method according to claim 1 wherein the plastic is selected from the group consisting of polyolefins, polyamides, polyacrylamides, polyesters, polyacrylic esters, polycarbonates, polytetrafluoroethylene and polyvinylacetate.

5. A method according to claim 1 wherein the plasic is a polyolefin.

6. A method according to claim 5 wherein the polyolefin is derived from $C_2$–$C_5$ olefins including copolymers and terpolymers thereof.

7. A method according to claim 6 wherein the polyolefin is polypropylene.

* * * * *